United States Patent
Tsai et al.

(10) Patent No.: US 12,020,421 B2
(45) Date of Patent: Jun. 25, 2024

(54) IMAGE DEFECT DETECTION METHOD, ELECTRONIC DEVICE USING THE SAME

(71) Applicant: HON HAI PRECISION INDUSTRY CO., LTD., New Taipei (TW)

(72) Inventors: Tung-Tso Tsai, New Taipei (TW); Chin-Pin Kuo, New Taipei (TW); Tzu-Chen Lin, New Taipei (TW); Shih-Chao Chien, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 392 days.

(21) Appl. No.: 17/585,819

(22) Filed: Jan. 27, 2022

(65) Prior Publication Data
US 2022/0253997 A1    Aug. 11, 2022

(30) Foreign Application Priority Data
Feb. 9, 2021 (CN) .......................... 202110180685.2

(51) Int. Cl.
*G06T 7/00* (2017.01)
*G06V 10/74* (2022.01)
*G06V 10/762* (2022.01)
*G06V 10/774* (2022.01)

(52) U.S. Cl.
CPC .......... *G06T 7/001* (2013.01); *G06V 10/761* (2022.01); *G06V 10/763* (2022.01); *G06V 10/774* (2022.01); *G06T 2207/20081* (2013.01)

(58) Field of Classification Search
USPC ........................................... 382/141
See application file for complete search history.

(56) References Cited

U.S. PATENT DOCUMENTS
2019/0378263 A1* 12/2019 Lai ............... G06V 10/7753

FOREIGN PATENT DOCUMENTS
CN   110648305   1/2020
CN   111881926   11/2020

* cited by examiner

*Primary Examiner* — Jacky X Zheng
(74) *Attorney, Agent, or Firm* — ScienBiziP, P.C.

(57) ABSTRACT

An image defect detection method is used in an electronic device. The electronic device determines a training image feature set, and trains a Gaussian mixture model by using the feature set to obtain an image defect detection model and a reference error value. An image for analysis is input into the autoencoder to obtain a second implicit vector and a second reconstructed image, and to calculate a second reconstruction error. The electronic device obtains a test image feature of the image for analysis according to the second reconstruction error and the second implicit vector, and inputs the test image feature into the image defect detection model to obtain a prediction score. The image for analysis is determined to reveal a defect when the prediction score is less than or equal to the reference error value.

20 Claims, 3 Drawing Sheets

IMAGE DEFECT DETECTION METHOD, ELECTRONIC DEVICE USING THE SAME

CROSS-REFERENCE TO RELATED APPLICATIONS

This application claims priority to Chinese Patent Application No. 202110180685.2 filed on Feb. 9, 2021, the contents of which are incorporated by reference herein.

FIELD

The subject matter herein generally relates to a field of data processing, and especially relates to an image defect detection method, and an electronic device.

BACKGROUND

In order to improve the quality of industrial products, a defect detection is executed before the industrial products are packaged. However, the current image defect detection methods need to rely on a large number of defect sample images, and the number of defect sample images is small, affecting the accuracy of defect detection.

BRIEF DESCRIPTION OF THE DRAWINGS

Implementations of the present disclosure will now be described, by way of embodiment, with reference to the attached figures.

DETAILED DESCRIPTION

Figure 1:
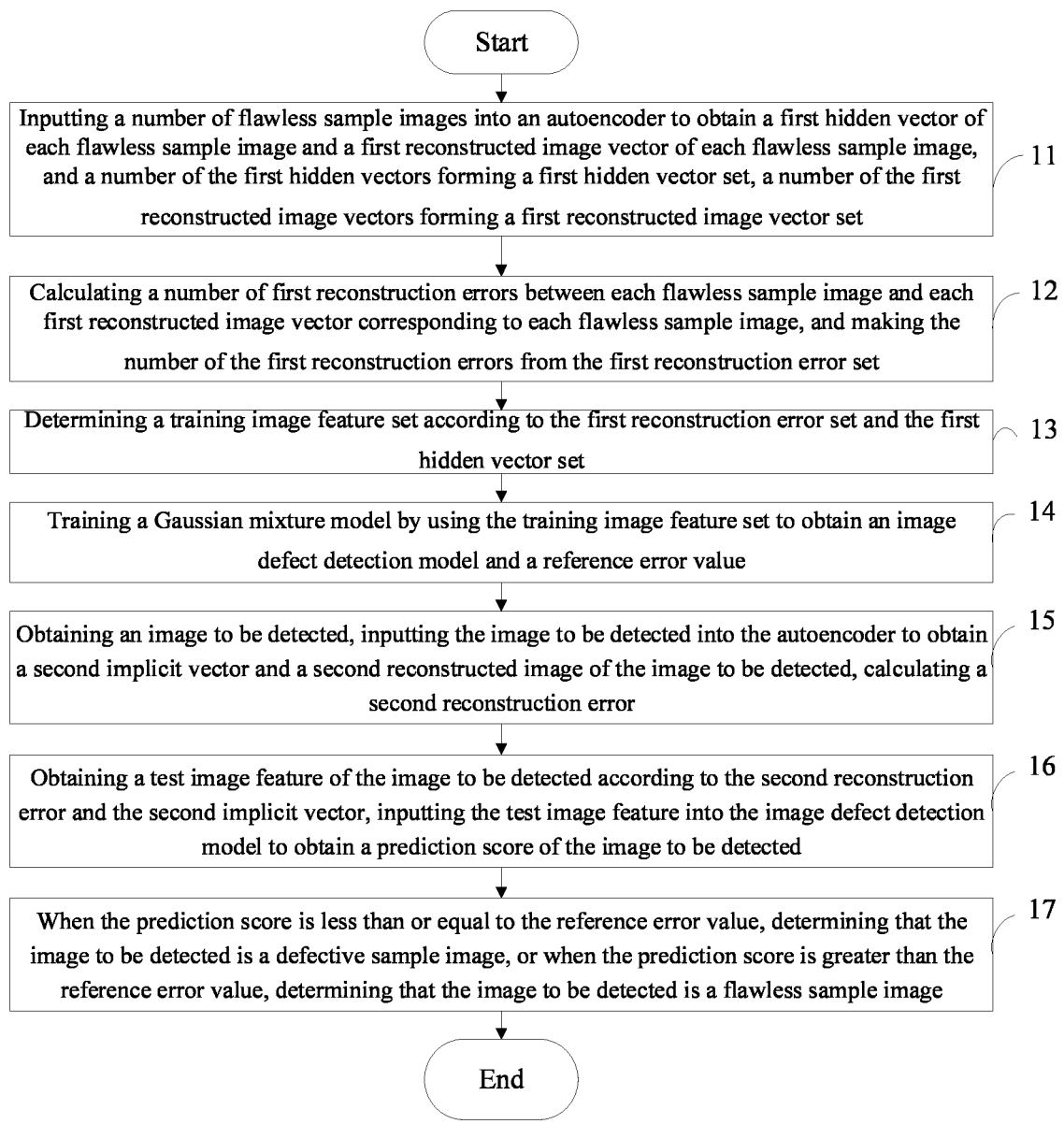
FIG. 1 is a flowchart of one embodiment of an image defect detection method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for detecting defects through the processing of images ("image defect detection method") is disclosed. The method is applied in one or more electronic devices. The electronic can automatically perform numerical calculation and/or information processing according to a number of preset or stored instructions. The hardware of the electronic device includes, but is not limited to a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server, or other computing devices. The device can carry out a human-computer interaction with user by a keyboard, a mouse, a remote controller, a touch pad or a voice control device.

FIG. 1 illustrates the image defect detection method. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, inputting a number of flawless sample images into an autoencoder to obtain a first hidden vector of each flawless sample image and a first reconstructed image vector of each flawless sample image, a number of the first hidden vectors forming a first hidden vector set, and a number of the first reconstructed image vectors forming a first reconstructed image vector set.

In one embodiment, the electronic device 6 obtains an image vector of each flawless sample image, inputs the image vector of each flawless sample image in the flawless sample image data set into a coding layer of the autoencoder for coding to obtain the first implicit vector of each flawless sample image, the number of the first implicit vectors forming the first implicit vector set. The electronic device 6 inputs the first hidden vector into the decoding layer of the autoencoder for decoding to obtain the first reconstructed image vector of each flawless sample image, and the number of the first reconstructed image vectors forms the first reconstructed image vector set.

In one embodiment, the electronic device 6 obtains each flawless sample image, obtains pixels of each flawless sample image, and the three primary color coding values of the pixels in each flawless sample image constitute the image vector of each flawless sample image.

For example, the image vector of each flawless sample image can be expressed as y, and y is input into the coding layer of the autoencoder for coding to obtain the first hidden vector which is expressed as h, wherein $h=f(y)$. The first hidden vector h is input into the decoding layer of the autoencoder for decoding to obtain the first reconstructed image vector which is expressed as ŷ, wherein ŷ=g(h)=g(f (y)), f is the coding layer of the autoencoder, and g is the decoding layer of the autoencoder.

At block 12, calculating a number of first reconstruction errors between each flawless sample image and each first reconstructed image vector corresponding to each flawless sample image, and making the number of the first reconstruction errors from the first reconstruction error set.

In one embodiment, the electronic device 6 uses a preset error calculation function to calculate a number of error function values between the image vector of each flawless sample image and each first reconstructed image vector, treats the number of the error function values as the number of the first reconstruction errors, and makes the number of the first reconstruction error from the first reconstruction error set.

In one embodiment, the electronic device 6 uses the preset error calculation function to calculate a mean square deviation between the image vector of each flawless sample image and the first reconstructed image vector.

For example, the image vector of each flawless sample image can be expressed as y, the first reconstructed image vector can be expressed as ŷ, the mean square deviation between the image vector of each flawless sample image and the first reconstructed image vector can be expressed as MSE, and the mean square deviation can be calculated according to a formula $$MSE = \frac{1}{n}\sum_{i=1}^{n}(y_i - \hat{y}_i)^2.$$

Therein, $y_i$ is the i-th vector in the image vectors of the flawless sample image, $\hat{y}_i$ is the i-th vector in the number of the first reconstruction vectors, and n is a dimension of the image vector of the flawless sample image and the first reconstructed image vector.

At block 13, determining a training image feature set according to the first reconstruction error set and the first hidden vector set.

In one embodiment, determining a training image feature set according to the first reconstruction error set and the first hidden vector set includes: splicing each first reconstruction error in the first reconstruction error set and each first hidden vector corresponding to the each first reconstruction error to obtain the training image feature set.

For example, the first reconstruction error set can be expressed as E=[$e_1$, $e_2$, . . . , $e_m$], the first hidden vector set can be H=[h1, h2, . . . , hm], and splicing each first reconstruction error in the first reconstruction error set and each first hidden vector according to a formula C=[($e_1$, h1), ($e_2$, h2), . . . , ($e_m$, hm)] to obtain the training image feature set which is expressed as C. Therein, $e_1$, $e_2$, . . . , $e_m$ are the first reconstruction errors in the first reconstruction error set, and h1, h2, . . . , hm are the first hidden vectors in the first hidden vector set.

At block 14, training a Gaussian mixture model by using the training image feature set to obtain an image defect detection model and a reference error value.

In one embodiment, the training of a Gaussian mixture model by using the training image feature set to obtain an image defect detection model and a reference error value includes: calculating the initial values of the parameters of the Gaussian mixture model according to the training image feature set by using a k-adjacent mean algorithm, updating the parameters of the Gaussian mixture model by using an expected value maximum algorithm until a first preset condition is satisfied, to obtain the image defect detection model, and setting the reference error value for a prediction value of the training image feature set according to the image defect detection model. In one embodiment, the parameters of the Gaussian mixture model include a mixture weighted value, an average vector, a covariance matrix, and a distribution number.

In one embodiment, calculating the initial values of the parameters of the Gaussian mixture model according to the training image feature set by using a k-adjacent mean algorithm includes:

a center selection step, selecting a preset number of clustering centers from the training image feature set;

a clustering step, performing a clustering operation on the training image feature set until a second preset condition is satisfied, to obtain a preset number of cluster groups, each cluster group corresponding to a cluster center, wherein the clustering operation including:

clustering the training image feature set according to the preset number of the clustering centers;

calculating a vector average value of the training image feature set after clustering as an updated clustering center;

a cluster number adjustment step, when the cluster groups does not satisfy a third preset condition, adjusting the preset number of the cluster groups, and executing the center selection step and the clustering step until the third preset condition is satisfied;

a parameter obtaining step, when the cluster group satisfies the second preset condition and the third preset condition, taking the parameters of the preset number of the cluster group as the initial value of the parameters of the Gaussian mixture model.

In one embodiment, the second preset condition is that the cluster center remains unchanged, the third preset condition is that a distance of the cluster centers of any two cluster groups is greater than a first threshold, and that the number of the training image features in each cluster group is greater than a second threshold.

In one embodiment, the preset number can be 8, the first threshold can be 3, and the second threshold can be 1. In one embodiment, the calculating of the initial values of the parameters of the Gaussian mixture model according to the training image feature set by using a k-adjacent mean algorithm includes:

the center selection step, selecting eight clustering centers from the training image feature set;

the clustering step, performing a clustering operation on the training image feature set until a second preset condition is satisfied to obtain eight cluster groups, each cluster group corresponding to a cluster center, wherein the clustering operation includes:

clustering the training image feature set according to eight clustering centers;

calculating the vector average value of the training image feature set after clustering as the updated clustering center;

the cluster number adjustment step, determining whether the cluster group satisfies the condition that the distance of the cluster centers of any two cluster groups is greater than 3 and the number of the training image features in each cluster group is greater than 1; when the distance of the cluster centers of the two cluster groups is less than or equal to 3 or the number of the training image features in the cluster group is equal to 1, reducing the preset number by one, and performing the center selection step and the clustering step until the distance of the cluster centers of the two cluster groups is greater than 3 and the number of the training image features in each cluster group is greater than 1;

the parameter obtaining step, when the cluster group satisfies the condition that the distance between the cluster centers of the two cluster groups is greater than 3 and the number of training image features in each cluster group is greater than 1, and the cluster center remains unchanged, taking the parameters of the preset number of the cluster group as the initial value of the parameters of the Gaussian mixture model, that is, taking the number of the cluster groups as the distribution number of the Gaussian mixture model, taking the number of the training image features of each group as a mixture weighted values of the Gaussian mixture model, taking the cluster center as an average vector of the Gaussian mixture model, and taking a variance of the cluster group as the covariance matrix of the Gaussian mixture model.

In one embodiment, the updating of the parameters of the Gaussian mixture model by using an expected value maximum algorithm until a first preset condition is satisfied to obtain the image defect detection model includes:

a similarity function value calculation step, calculating a maximum similarity function value according to the initial value of the parameters of the Gaussian mixture model;

a parameter adjustment step, adjusting the parameters of the Gaussian mixture model according to a partial differential of the parameters of the Gaussian mixture model, and taking the adjusted parameters of the Gaussian mixture model as the initial value of the parameters of the Gaussian mixture model;

executing in a circular fashion the similarity function value calculation step and the parameter adjustment step until the first preset condition is satisfied.

For example, when the Gaussian mixture model is composed of three Gaussian distribution functions, a probability density function of the Gaussian mixture model can be calculated according to a formula $P(x)=w\_1\ g(x;\mu\_1, \Sigma\_1)+w\_2\ g(x;\mu\_2, \Sigma\_2)+w\_3\ g(x;\mu\_3, \Sigma\_3)$. Therein, w is the mixed weighted value, $\mu$ is the mean vector, $\Sigma$ is the covariance matrix, and g is the Gaussian distribution. The maximum similarity function value can be calculated according to a formula $E(\lambda)=\Sigma_{i=1}^{n} \ln[P(x_i)]$, wherein n is the number of the training image features, P is the probability density function of the Gaussian mixture model, and $\lambda$ is a parameter corresponding to the maximum similarity function value.

In one embodiment, adjusting the parameters of the Gaussian mixture model according to the partial differential of the parameters of the Gaussian mixture model includes:

calculating a partial differential of the average vector $\mu_j$ of a j-th Gaussian distribution to obtain a new average vector of the Gaussian mixture model, the average vector of the Gaussian mixture model being calculated according to a formula $$\mu_j = \frac{\Sigma_{i=1}^{n} \beta_j(x_i) x_i}{\Sigma_{i=1}^{n} \beta_j(x_i)};$$

calculating a partial differential of the covariance matrix $\Sigma_j$ of the j-th Gaussian distribution to obtain a new covariance matrix of Gaussian mixture model, the covariance matrix being calculated according to a formula $$\sum\nolimits_j = \frac{\Sigma_{i=1}^{n} \beta_j(x_i)(x_i - \mu_j)(x_i - \mu_j)^T}{\Sigma_{i=1}^{n} \beta_j(x_i)};$$

calculating a partial differential of the mixed weighted value $w_j$ of the j-th Gaussian distribution to obtain a new mixture weighting value of Gaussian mixture model, the mixture weighting value being calculated according to a formula $$w_j = \frac{1}{n} \sum\nolimits_{i=1}^{n} \beta_j(x_i).$$

In one embodiment, circularly executing the similarity function value calculation step and the parameter adjustment step until the first preset condition is satisfied includes: the first preset condition is satisfied when the similarity function value converges or the number of times of executing the parameter adjustment step or the similarity function value calculation step reaches preset iterations.

At block 15, obtaining an image for analysis as to defects revealed ("image to be detected"), inputting the image to be detected into the autoencoder to obtain a second implicit vector and a second reconstructed image of the image to be detected, calculating a second reconstruction error according to the image to be detected and the second reconstructed image.

At block 16, obtaining a test image feature of the image to be detected according to the second reconstruction error and the second implicit vector, inputting the test image feature into the image defect detection model to obtain a prediction score of the image to be detected.

At block 17, when the prediction score is less than or equal to the reference error value, determining that the image to be detected is a defective sample image, or when the prediction score is greater than the reference error value, determining that the image to be detected is a flawless sample image.

For example, the reference error value may be 0.8. In one embodiment, when the prediction score of the image to be detected is less than or equal to 0.8, it is determined that the image to be detected is a defective sample image. When the prediction score of the image to be detected is greater than 0.8, it is determined that the image to be detected is a flawless sample image.

In the present disclosure, the Gaussian mixture model is trained by the image features from the autoencoder, and the image defect detection model can be established by using the flawless sample image, so as to predict the distribution of defect samples and improve the accuracy of defect detection.

Figure 2:
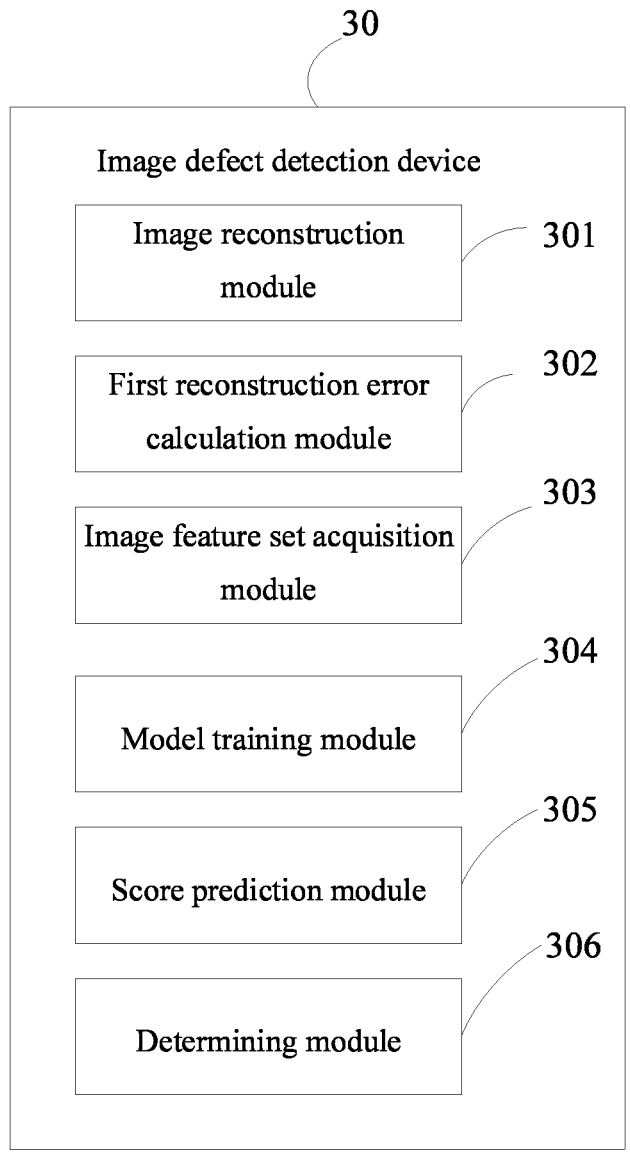
FIG. 2 is a block diagram of one embodiment of a image defect detection device.

FIG. 2 illustrates an image defect detection device 30. The image defect detection device 30 is applied in the electronic device 6. In one embodiment, according to the functions it performs, the image defect detection device 30 can be divided into a plurality of functional modules. The functional modules perform the blocks 11-17 in the embodiment of FIG. 1 to perform the functions of image defect detection.

In one embodiment, the image defect detection device 30 includes, but is not limited to, an image reconstruction module 301, a first reconstruction error calculation module 302, an image feature set acquisition module 303, a model training module 304, a score prediction module 305, and a determining module 306. The modules 301-306 of the image defect detection device 30 can be collections of software instructions. In one embodiment, the program code of each program segment in the software instructions can be stored in a storage and executed by at least one processor to perform the required functions.

The image reconstruction module 301 inputs a number of flawless sample images into an autoencoder to obtain a first hidden vector of each flawless sample image and a first reconstructed image vector of each flawless sample image, the number of the first hidden vectors forms a first hidden vector set, and the number of the first reconstructed image vectors forms a first reconstructed image vector set.

In one embodiment, the image reconstruction module 301 obtains an image vector of each flawless sample image, inputs the image vector of each flawless sample image in the flawless sample image data set into a coding layer of the autoencoder for coding to obtain the first implicit vector of each flawless sample image, and the number of the first implicit vectors forms the first implicit vector set. The image reconstruction module 301 inputs the first hidden vector into the decoding layer of the autoencoder for decoding to obtain the first reconstructed image vector of each flawless sample image, and the number of the first reconstructed image vectors forms the first reconstructed image vector set.

In one embodiment, the image reconstruction module 301 obtains each of the flawless sample images, obtains pixels of each flawless sample image, and makes three primary color coding values of the pixels in each flawless sample image constitute the image vector of each flawless sample image.

For example, the image vector of each flawless sample image can be expressed as y, and y is input into the coding layer of the autoencoder for coding to obtain the first hidden vector which is expressed as h, wherein h=f(y). The first hidden vector h is input into the decoding layer of the autoencoder for decoding to obtain the first reconstructed image vector which is expressed as $\hat{y}$, $\hat{y}$=g(h)=g(f(y)), where f is the coding layer of the autoencoder, and g is the decoding layer of the autoencoder.

The first reconstruction error calculation module 302 calculates a number of first reconstruction errors between each flawless sample image and each first reconstructed image vector corresponding to the each flawless sample image, and makes the number of the first reconstruction errors from the first reconstruction error set.

In one embodiment, the first reconstruction error calculation module 302 uses a preset error calculation function to calculate a number of error function values between the image vector of each flawless sample image and each first reconstructed image vector, treats the number of the error function values as the number of the first reconstruction errors, and makes the number of the first reconstruction errors from the first reconstruction error set.

In one embodiment, the first reconstruction error calculation module 302 uses the preset error calculation function to calculate a mean square deviation between the image vector of each flawless sample image and the first reconstructed image vector.

For example, the image vector of each flawless sample image can be expressed as y, the first reconstructed image vector can be expressed as $\hat{y}$, the mean square deviation between the image vector of each flawless sample image and the first reconstructed image vector can be expressed as MSE, and the mean square deviation can be calculated according to a formula $$MSE = \frac{1}{n}\sum_{i=1}^{n}(y_i - \hat{y}_i)^2.$$

Therein, $y_i$ is the i-th vector in the image vectors of the flawless sample image, $\hat{y}_i$ is the i-th vector in the number of the first reconstruction vectors, and n is a dimension of the image vector of the flawless sample image and the first reconstructed image vector.

The image feature set acquisition module 303 determines a training image feature set according to the first reconstruction error set and the first hidden vector set.

In one embodiment, the image feature set acquisition module 303 splices each first reconstruction error in the first reconstruction error set and each first hidden vector corresponding to the each first reconstruction error to obtain the training image feature set.

For example, the first reconstruction error set can be expressed as E=[$e_1$, $e_2$, ..., $e_m$], the first hidden vector set can be H=[h1, h2, ..., hm], splicing each first reconstruction error in the first reconstruction error set and each first hidden vector according to a formula C=[($e_1$, h1), ($e_2$, h2), ..., ($e_m$, hm)] to obtain the training image feature set, which is expressed as C. Therein, $e_1$, $e_2$, ..., $e_m$ are the first reconstruction errors in the first reconstruction error set, and h1, h2, ..., hm are the first hidden vectors in the first hidden vector set.

The model training module 304 trains a Gaussian mixture model by using the training image feature set to obtain an image defect detection model and a reference error value.

In one embodiment, the training of a Gaussian mixture model by using the training image feature set to obtain an image defect detection model and a reference error value includes: calculating the initial values of the parameters of the Gaussian mixture model according to the training image feature set by using a k-adjacent mean algorithm, updating the parameters of the Gaussian mixture model by using an expected value maximum algorithm until a first preset condition is satisfied to obtain the image defect detection model, and setting the reference error value for a prediction value set of the training image feature set according to the image defect detection model. In one embodiment, the parameters of the Gaussian mixture model include a mixture weighted value, an average vector, a covariance matrix, and a distribution number.

In one embodiment, the calculation of initial values of the parameters of the Gaussian mixture model according to the training image feature set by using a k-adjacent mean algorithm includes:

a center selection step, selecting a preset number of clustering centers from the training image feature set;

a clustering step, performing a clustering operation on the training image feature set until a second preset condition is satisfied to obtain a preset number of cluster groups, each cluster group corresponding to a cluster center, wherein the clustering operation includes:

clustering the training image feature set according to the preset number of the clustering centers;

calculating a vector average value of the training image feature set after clustering as an updated clustering center;

a cluster number adjustment step, when the cluster group does not satisfy a third preset condition, adjusting the preset number of the cluster groups, and executing the center selection step and the clustering step until the third preset condition is satisfied;

a parameter obtaining step, when the cluster group satisfies the second preset condition and the third preset condition, taking the parameters of the preset number of the cluster group as the initial value of the parameters of the Gaussian mixture model.

In one embodiment, the second preset condition is that the cluster center remains unchanged, the third preset condition is that a distance of the cluster centers of any two cluster groups is greater than a first threshold, and that the number of the training image features in each cluster group is greater than a second threshold.

In one embodiment, the preset number can be 8, the first threshold can be 3, and the second threshold can be 1. In one embodiment, the calculation of initial values of the parameters of the Gaussian mixture model according to the training image feature set by using a k-adjacent mean algorithm includes:

the center selection step, selecting eight clustering centers from the training image feature set;

the clustering step, performing a clustering operation on the training image feature set until a second preset condition is satisfied to obtain eight cluster groups, each cluster group corresponding to a cluster center, wherein the clustering operation includes:
  clustering the training image feature set according to eight clustering centers;
  calculating the vector average value of the training image feature set after clustering as the updated clustering center;

the cluster number adjustment step, determining whether the cluster group satisfies the condition that the distance of the cluster centers of any two cluster groups is greater than 3 and the number of the training image features in each cluster group is greater than 1. When the distance of the cluster centers of the two cluster groups is less than or equal to 3 or the number of the training image features in the cluster group is equal to 1, reducing the preset number by one, and performing the center selection step and the clustering step until the distance of the cluster centers of the two cluster groups is greater than 3 and the number of the training image features in each cluster group is greater than 1;

the parameter obtaining step, when the cluster group satisfies the condition that the distance between the cluster centers of the two cluster groups is greater than 3 and the number of training image features in each cluster group is greater than 1, and the cluster center remains unchanged, taking the parameters of the preset number of the cluster group as the initial value of the parameters of the Gaussian mixture model. That is, taking the number of the cluster groups as the distribution number of the Gaussian mixture model, taking the number of the training image features of each group as a mixture weighted values of the Gaussian mixture model, taking the cluster center as an average vector of the Gaussian mixture model, and taking a variance of the cluster group as the covariance matrix of the Gaussian mixture model.

In one embodiment, the updating of the parameters of the Gaussian mixture model by using an expected value maximum algorithm until a first preset condition is satisfied to obtain the image defect detection model includes:

a similarity function value calculation step, calculating a maximum similarity function value according to the initial value of the parameters of the Gaussian mixture model;

a parameter adjustment step, adjusting the parameters of the Gaussian mixture model according to a partial differential of the parameters of the Gaussian mixture model, and taking the adjusted parameters of the Gaussian mixture model as the initial value of the parameters of the Gaussian mixture model;

a circular execution of the similarity function value calculation step and the parameter adjustment step until the first preset condition is satisfied.

For example, when the Gaussian mixture model is composed of three Gaussian distribution functions, a probability density function of the Gaussian mixture model can be calculated according to a formula $P(x)=w\_1\, g(x;\mu\_1, \Sigma\_1)+w\_2\, g(x;\mu\_2, \Sigma\_2)+w\_3\, g(x;\mu\_3, \Sigma\_3)$, wherein w is the mixed weighted value, $\mu$ is the mean vector, $\Sigma$ is the covariance matrix, and g is the Gaussian distribution. The maximum similarity function value can be calculated according to a formula $E(\lambda)=\Sigma_{i=1}^{n}\, [P(x_i)]$, wherein n is the number of the training image features, P is the probability density function of the Gaussian mixture model, and $\lambda$ is a parameter corresponding to the maximum similarity function value.

In one embodiment, the adjustment of parameters of the Gaussian mixture model according to the partial differential of the parameters of the Gaussian mixture model includes:

calculating a partial differential of the average vector $\mu_j$ of a j-th Gaussian distribution to obtain a new average vector of the Gaussian mixture model, and the average vector of the Gaussian mixture model being calculated according to a formula $$\mu_j = \frac{\Sigma_{i=1}^{n}\beta_j(x_i)x_i}{\Sigma_{i=1}^{n}\beta_j(x_i)};$$

calculating a partial differential of the covariance matrix $\Sigma_j$ of the j-th Gaussian distribution to obtain a new covariance matrix of Gaussian mixture model, the covariance matrix being calculated according to a formula $$\sum\nolimits_j = \frac{\Sigma_{i=1}^{n}\beta_j(x_i)(x_i-\mu_j)(x_i-\mu_j)^T}{\Sigma_{i=1}^{n}\beta_j(x_i)};$$

calculating a partial differential of the mixed weighted value $w_j$ of the j-th Gaussian distribution to obtain a new mixture weighting value of Gaussian mixture model, the mixture weighting value being calculated according to a formula $$w_j = \frac{1}{n}\sum\nolimits_{i=1}^{n}\beta_j(x_i).$$

In one embodiment, the circular execution of the similarity function value calculation step and the parameter adjustment step until the first preset condition is satisfied includes: the first preset condition is satisfied when the similarity function value converges or the number of executions of the parameter adjustment step or the similarity function value calculation step reaches a preset number of iterations.

The score prediction module 305 obtains an image to be detected, inputs the image to be detected into the autoencoder to obtain a second implicit vector and a second reconstructed image of the image to be detected, and calculates a second reconstruction error according to the image to be detected and the second reconstructed image.

The score prediction module 305 further obtains a test image feature of the image to be detected according to the second reconstruction error and the second implicit vector, and inputs the test image feature into the image defect detection model to obtain a prediction score of the image to be detected.

The determining module 306 determines that the image to be detected is a defective sample image when the prediction score is less than or equal to the reference error value. When the prediction score is greater than the reference error value, the determining module 306 determines that the image to be detected is a flawless sample image.

For example, the reference error value may be 0.8. In one embodiment, when the prediction score of the image to be detected is less than or equal to 0.8, the determining module 306 determines that the image to be detected is a defective sample image. When the prediction score of the image to be detected is greater than 0.8, the determining module 306 determines that the image to be detected is a flawless sample image.

In the present disclosure, the Gaussian mixture model is trained by the image features from the autoencoder, and the image defect detection model can be established by using the flawless sample image, so as to predict the distribution of defect samples and improve the accuracy of defect detection.

Figure 3:
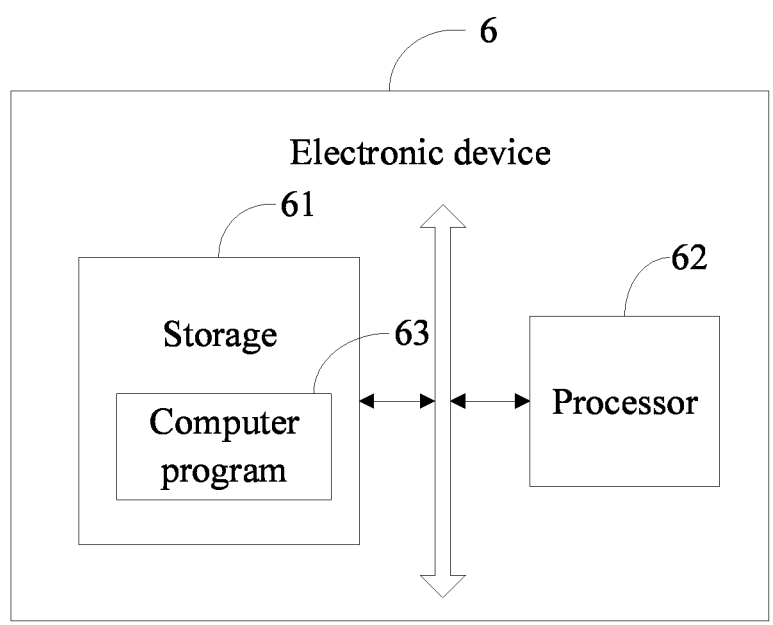
FIG. 3 is a schematic diagram of one embodiment of an electronic device.

FIG. 3 illustrates the electronic device 6. The electronic device 6 includes a storage 61, a processor 62, and a computer program 63 stored in the storage 61 and executed by the processor 62. When the processor 62 executes the computer program 63, the blocks in the embodiment of the image defect detection method are implemented, for example, blocks 11 to 17 as shown in FIG. 1. Alternatively, when the processor 62 executes the computer program 63, the functions of the modules in the embodiment of the image defect detection device are implemented, for example, modules 301-306 shown in FIG. 2.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the image reconstruction module 301, the first reconstruction error calculation module 302, the image feature set acquisition module 303, the model training module 304, the score prediction module 305, and the determining module 306 as shown in FIG. 2.

In one embodiment, the electronic device 6 can be a computing device such as a desktop computer, a notebook, a handheld computer, and a cloud terminal device. FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules or units stored in the storage 61 and calling up the data stored in the storage 61.

In one embodiment, the storage 61 may mainly include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a high-speed random access memory, and may also include a non-volatile memory, such as a hard disk, an internal memory, a plug-in hard disk, a smart media card (SMC), a secure digital (SD) card, a flash card, at least one disk storage device, a flash memory device, or other volatile solid state storage device In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An image defect detection method comprising:
inputting a plurality of flawless sample images into an autoencoder to obtain first hidden vectors of the flawless sample images and first reconstructed image vectors of the flawless sample images, and the plurality of the first hidden vectors forming a first hidden vector set, and the first reconstructed image vectors forming a first reconstructed image vector set;
calculating a plurality of first reconstruction errors between each flawless sample image and each first reconstructed image vector corresponding to the each flawless sample image, and making the plurality of the first reconstruction errors from the first reconstruction error set;

determining a training image feature set according to the first reconstruction error set and the first hidden vector set;

training a Gaussian mixture model by using the training image feature set to obtain an image defect detection model and a reference error value;

obtaining an image to be detected, inputting the image to be detected into the autoencoder to obtain a second implicit vector and a second reconstructed image of the image to be detected, calculating a second reconstruction error according to the image to be detected and the second reconstructed image;

obtaining a test image feature of the image to be detected according to the second reconstruction error and the second implicit vector, inputting the test image feature into the image defect detection model to obtain a prediction score of the image to be detected;

when the prediction score is less than or equal to the reference error value, determining that the image to be detected is a defective sample image; or when the prediction score is greater than the reference error value, determining that the image to be detected is a flawless sample image.

2. The image defect detection method as recited in claim 1, further comprising:

obtaining an image vector of each flawless sample image;

inputting the image vector of each flawless sample image in the flawless sample image data set into a coding layer of the autoencoder for coding to obtain a plurality of the first implicit vectors of the flawless sample images, and making the plurality of the first implicit vectors form the first implicit vector set;

inputting the first hidden vector into a decoding layer of the autoencoder for decoding to obtain the first reconstructed image vectors of the flawless sample images, and making the first reconstructed image vectors form the first reconstructed image vector set.

3. The image defect detection method as recited in claim 2, further comprising:

using a preset error calculation function to calculate a plurality of error function values between the image vectors of the flawless sample images and the first reconstructed image vectors, regarding the plurality of error function values as the plurality of the first reconstruction errors, and making the plurality of the first reconstruction errors from the first reconstruction error set.

4. The image defect detection method as recited in claim 1, further comprising:

calculating initial values of a plurality of parameters of the Gaussian mixture model according to the training image feature set by using a k-adjacent mean algorithm, and the plurality of the parameters of the Gaussian mixture model comprising a mixture weighted value, an average vector, a covariance matrix or a distribution number;

updating the plurality of the parameters of the Gaussian mixture model by using an expected value maximum algorithm until a first preset condition is satisfied to obtain the image defect detection model;

setting the reference error value according to the image defect detection model.

5. The image defect detection method as recited in claim 4, further comprising:

a center selection step, selecting a preset number of clustering centers from the training image feature set;

a clustering step, performing a clustering operation on the training image feature set until a second preset condition is satisfied to obtain the preset number of cluster groups, each cluster group corresponding to a cluster center, wherein the clustering operation comprising:

clustering the training image feature set according to the preset number of the clustering centers;

calculating a vector average value of the training image feature set as an updated clustering center a cluster number adjustment step, when the cluster groups don't satisfy a third preset condition, adjusting the preset number of the cluster groups, and executing the center selection step and the clustering step until the third preset condition is satisfied;

a parameter obtaining step, when the cluster group satisfies the second preset condition and the third preset condition, taking the preset number of parameters of the cluster group as the initial value of the parameters of the Gaussian mixture model.

6. The image defect detection method as recited in claim 5, wherein the second preset condition is that the cluster center remains unchanged, and the third preset condition is that a distance of the cluster centers of any two cluster groups is greater than a first threshold, and that the number of the training image features in each cluster group is greater than a second threshold.

7. The image defect detection method as recited in claim 4, further comprising:

a similarity function value calculation step, calculating a maximum similarity function value according to the initial value of the parameters of the Gaussian mixture model;

a parameter adjustment step, adjusting the parameters of the Gaussian mixture model according to a partial differential of the parameters of the Gaussian mixture model, and taking the adjusted parameters of the Gaussian mixture model as the initial value of the parameters of the Gaussian mixture model;

circularly executing the similarity function value calculation step and the parameter adjustment step until the first preset condition is satisfied.

8. The image defect detection method as recited in claim 7, wherein the first preset condition is satisfied when the similarity function value converges or the number of times of executing the parameter adjustment step or the similarity function value calculation step reaches preset iterations.

9. An electronic device comprising:

a processor; and a non-transitory storage medium coupled to the processor and configured to store a plurality of instructions, which cause the processor to:

input a plurality of flawless sample images into an autoencoder to obtain first hidden vectors of the flawless sample images and first reconstructed image vectors of the flawless sample images, wherein the plurality of the first hidden vectors forms a first hidden vector set, and the first reconstructed image vectors forms a first reconstructed image vector set;

calculate a plurality of first reconstruction errors between each flawless sample image and each first reconstructed image vector corresponding to the each flawless sample image, and make the plurality of the first reconstruction errors from the first reconstruction error set;

determine a training image feature set according to the first reconstruction error set and the first hidden vector set;

train a Gaussian mixture model by using the training image feature set to obtain an image defect detection model and a reference error value;

obtain an image to be detected, input the image to be detected into the autoencoder to obtain a second implicit vector and a second reconstructed image of the image to be detected, calculate a second reconstruction error according to the image to be detected and the second reconstructed image;

obtain a test image feature of the image to be detected according to the second reconstruction error and the second implicit vector, input the test image feature into the image defect detection model to obtain a prediction score of the image to be detected;

determine that the image to be detected is a defective sample image when the prediction score is less than or equal to the reference error value; or determine that the image to be detected is a flawless sample image when the prediction score is greater than the reference error value.

10. The electronic device as recited in claim 9, wherein the plurality of instructions are further configured to cause the processor to:

obtain an image vector of each flawless sample image;

input the image vector of each flawless sample image in the flawless sample image data set into a coding layer of the autoencoder for coding to obtain a plurality of the first implicit vectors of the flawless sample images, and make the plurality of the first implicit vectors form the first implicit vector set;

input the first hidden vector into a decoding layer of the autoencoder for decoding to obtain the first reconstructed image vectors of the flawless sample images, and make the first reconstructed image vectors form the first reconstructed image vector set.

11. The electronic device as recited in claim 10, wherein the plurality of instructions are further configured to cause the processor to:

use a preset error calculation function to calculate a plurality of error function values between the image vectors of the flawless sample images and the first reconstructed image vectors, regard the plurality of error function values as the plurality of the first reconstruction errors, and make the plurality of the first reconstruction errors from the first reconstruction error set.

12. The electronic device as recited in claim 9, wherein the plurality of instructions are further configured to cause the processor to:

calculate initial values of a plurality of parameters of the Gaussian mixture model according to the training image feature set by using a k-adjacent mean algorithm, wherein the plurality of the parameters of the Gaussian mixture model comprises a mixture weighted value, an average vector, a covariance matrix or a distribution number;

update the plurality of the parameters of the Gaussian mixture model by using an expected value maximum algorithm until a first preset condition is satisfied to obtain the image defect detection model;

set the reference error value according to the image defect detection model.

13. The electronic device as recited in claim 12, wherein the plurality of instructions are further configured to cause the processor to:

select a preset number of clustering centers from the training image feature set;

perform a clustering operation on the training image feature set until a second preset condition is satisfied to obtain the preset number of cluster groups, wherein each cluster group corresponding to a cluster center, the clustering operation comprise:

clustering the training image feature set according to the preset number of the clustering centers;

calculating a vector average value of the training image feature set as an updated clustering center when the cluster groups don't satisfy a third preset condition, adjust the preset number of the cluster groups, and select the preset number of clustering centers from the training image feature set, and perform the clustering operation on the training image feature set to obtain the preset number of cluster groups until the third preset condition is satisfied;

when the cluster group satisfies the second preset condition and the third preset condition, take the preset number of parameters of the cluster group as the initial value of the parameters of the Gaussian mixture model.

14. The electronic device as recited in claim 13, wherein the second preset condition is that the cluster center remains unchanged, and the third preset condition is that a distance of the cluster centers of any two cluster groups is greater than a first threshold, and that the number of the training image features in each cluster group is greater than a second threshold.

15. The electronic device as recited in claim 12, wherein the plurality of instructions are further configured to cause the processor to:

calculate a maximum similarity function value according to the initial value of the parameters of the Gaussian mixture model;

adjust the parameters of the Gaussian mixture model according to a partial differential of the parameters of the Gaussian mixture model, and take the adjusted parameters of the Gaussian mixture model as the initial value of the parameters of the Gaussian mixture model calculate the maximum similarity function value, adjust the parameters of the Gaussian mixture model until the first preset condition is satisfied.

16. The electronic device as recited in claim 15, wherein the first preset condition is satisfied when the similarity function value converges or the number of times of executing the parameter adjustment step or the similarity function value calculation step reaches preset iterations.

17. A non-transitory storage medium having stored thereon instructions that, when executed by at least one processor of an electronic device, causes the least one processor to execute instructions of an image defect detection method, the method comprising:

inputting a plurality of flawless sample images into an autoencoder to obtain first hidden vectors of the flawless sample images and first reconstructed image vectors of the flawless sample images, and the plurality of the first hidden vectors forming a first hidden vector set, and the first reconstructed image vectors forming a first reconstructed image vector set;

calculating a plurality of first reconstruction errors between each flawless sample image and each first reconstructed image vector corresponding to the each flawless sample image, and making the plurality of the first reconstruction errors from the first reconstruction error set;

determining a training image feature set according to the first reconstruction error set and the first hidden vector set;

training a Gaussian mixture model by using the training image feature set to obtain an image defect detection model and a reference error value;

obtaining an image to be detected, inputting the image to be detected into the autoencoder to obtain a second implicit vector and a second reconstructed image of the image to be detected, calculating a second reconstruction error according to the image to be detected and the second reconstructed image;

obtaining a test image feature of the image to be detected according to the second reconstruction error and the second implicit vector, inputting the test image feature into the image defect detection model to obtain a prediction score of the image to be detected;

when the prediction score is less than or equal to the reference error value, determining that the image to be detected is a defective sample image; or when the prediction score is greater than the reference error value, determining that the image to be detected is a flawless sample image.

18. The non-transitory storage medium as recited in claim 17, wherein the image defect detection method comprising:

obtaining an image vector of each flawless sample image;

inputting the image vector of each flawless sample image in the flawless sample image data set into a coding layer of the autoencoder for coding to obtain a plurality of the first implicit vectors of the flawless sample images, and making the plurality of the first implicit vectors form the first implicit vector set;

inputting the first hidden vector into a decoding layer of the autoencoder for decoding to obtain the first reconstructed image vectors of the flawless sample images, and making the first reconstructed image vectors form the first reconstructed image vector set.

19. The non-transitory storage medium as recited in claim 18, wherein the image defect detection method comprising:

using a preset error calculation function to calculate a plurality of error function values between the image vectors of the flawless sample images and the first reconstructed image vectors, regarding the plurality of error function values as the plurality of the first reconstruction errors, and making the plurality of the first reconstruction errors from the first reconstruction error set.

20. The non-transitory storage medium as recited in claim 17, wherein the image defect detection method comprising:

calculating initial values of a plurality of parameters of the Gaussian mixture model according to the training image feature set by using a k-adjacent mean algorithm, and the plurality of the parameters of the Gaussian mixture model comprising a mixture weighted value, an average vector, a covariance matrix or a distribution number;

updating the plurality of the parameters of the Gaussian mixture model by using an expected value maximum algorithm until a first preset condition is satisfied to obtain the image defect detection model;

setting the reference error value according to the image defect detection model.

* * * * *